Patented July 29, 1952

2,605,241

UNITED STATES PATENT OFFICE 2,605,241

RECLAIMING RUBBER WITH BIS(TRIALKYL PHENOL) SULFIDES

Harry E. Albert, Akron, Ohio, assignor to The Firestone Tire & Rubber Company, Akron, Ohio, a corporation of Ohio No Drawing. Application June 7, 1947, Serial No. 753,361. In Canada November 22, 1946

6 Claims. (Cl. 260—2.3)

This application is a continuation-in-part of my copending application Serial No. 643,828, filed January 26, 1946, and matured into U. S. 2,581,919.

This invention relates to the reclaiming of vulcanizates of both natural and synthetic rubbers. The reclaiming is effected by heating the vulcanizate at a temperature of at least 300° F. with a softening and swelling agent composed at least in part of a bis(trialkylphenol) sulfide of the formula:

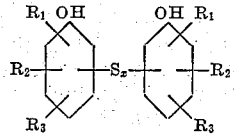

where $R_1$, $R_2$, and $R_3$ are alkyl groups containing one to nine carbon atoms placed so that at least one ortho or the para position is open for the sulfur linkage, $x$ is 1 to 4 but preferably 1 or 2, and the total number of carbon atoms in $R_1$, $R_2$, and $R_3$ is in the range from 3 to about 20. The bis(3,4,6-trialkylphenol) sulfides and particularly the bis(4,6-dialkyl-m-cresol) sulfides are preferred.

The bis(trialkylphenol) sulfides are preferably prepared by reacting a suitable phenol with a sulfur chloride in an inert solvent, such as carbon tetrachloride, ethylene dichloride, etc. To obtain compounds where $x$ in the above general formula equals 3 or 4, free sulfur may be added to the reaction mixture. The solvent may be omitted, and the mixture may be heated. The preferred treating agents are monosulfides or disulfides. They are advantageously prepared by reacting the phenol with sulfur monochloride with or without heating. This general reaction is known.

The bis(trialkylphenol) sulfides may be prepared by reacting sulfur monochloride or sulfur dichloride with a phenol, such as:

4,6-di-tert-butyl-m-cresol
 4,6-di-sec-butyl-m-cresol
 4,6-di-tert-amyl-m-cresol
 4,6-di-sec-amyl-m-cresol
 4,6-diheptyl-m-cresol
 3,4,6-trimethylphenol
 3,4-dimethyl-6-tert-octylphenol
 3,5-dimethyl-4-butylphenol
 4,6-diisopropyl-m-cresol
 4,6-di-tert-octyl-3-isopropylphenol
 4,6-diethyl-m-cresol
 4,6-di-tert-octyl-m-cresol
 4,6-di-tert-nonyl-m-cresol
 3-methyl-4-tert-butyl-6-methylphenol
 2,3-dimethyl-4-butylphenol In each of these phenols at least one ortho or para position is open and available for reaction with the sulfur chloride.

The bis(trialkylphenol) sulfide may be used alone or with other softening or swelling agents. It has been found that in alkaline solutions bis(trialkylphenol) sulfides do not soften the vulcanizate to the extent that they do in neutral or slightly acidic solutions so that the latter are preferred. There appears to be a chemical reaction between the rubber and at least some of the bis(trialkylphenol) sulfide. If as little as 3 per cent on the weight of the vulcanizate is used, the reaction appears to be catalytic. Using temperatures as high as 600° F., one obtains increased activity in the treatment of GR-S vulcanizate if as little as ½ per cent of one of the bis(trialkylphenol) sulfides of this invention (based on the weight of the vulcanizate) is added to any of the usual softening and swelling compositions. At lower temperatures of about 300° F., as little as 0.5 to 1.0 per cent gives a quite noticeable effect. With GR-S inner-tube stock, for example, as little as 1.0 per cent at such lower temperatures gives noticeable chemical softening. The bis(trialkylphenol) sulfides are much more active on natural rubber than GR-S, and as little as 0.1 per cent has a noticeable effect on natural rubber vulcanizate. If fiber is present in the scrap rubber, it is desirable to use a cellulose hydrolyzing agent along with the chemical softener.

Swelling agents, such as crude solvent naphtha, refined solvent naphtha, petroleum naphtha, turpentine, dipentene, cymene, etc., may be added to the bis(trialkylphenol) sulfide prior to use in order to swell the rubber. This aids the catalytic reclaiming action. Softening agents, such as asphalt, pine tar, mineral rubber, medium process oil, rosin, coumarone resins, rosin oil, etc., may be used in the reclaiming process with the bis(trialkylphenol) sulfide. Some of these introduce tack into the reclaim in addition to softening the vulcanizate. Less total softening or swelling agent is required when a reclaiming agent of this invention is present.

In using one of the bis(trialkylphenol) sulfides of the present invention on a vulcanizate of natural rubber, it will be found that its action is so rapid that generally it will not be used alone, particularly when the reclaiming is conducted at a high temperature. A solution of 10 or 20 per cent of the bis(trialkylphenol) sulfide in a liquid swelling or softening agent, such as one of those above mentioned, will usually be found satisfactory and more advantageous than the use of the bis(trialkylphenol) sulfide without diluent.

The bis(trialkylphenol) sulfide is preferably used to reclaim the synthetics which are known to be more resistant than natural rubber to the action of softening and swelling agents. It may be used satisfactorily in reclaiming a rubber-like polymerized chloroprene (neoprenes), a rubber-like copolymer of isobutylene and a small amount of butadiene-1,3 or isoprene (Butyl rubber), a rubber-like copolymer of butadiene-1,3 and styrene (GR–S) or acrylonitrile (Buna N), etc., or mixtures of these with themselves and natural rubber.

The following examples are illustrative:

EXAMPLES 1–3

Three batches for pan-heater treatment were prepared, each containing 100 parts of GR–S No. 1 peelings (prepared from vulcanized GR–S scrap) ground to 5 mesh. The reclaiming agent was composed of 3 parts dipolymer oil (more accurately termed an aromatic hydrocarbon distillate consisting of mixed polymers of coumarone and indene resins in liquid form), 5 parts pine-tar oil, 5 parts dipentene, 2 parts rosin, and, for the respective batches:

Example 1: 2 parts diphenol disulfide
Example 2: 2 parts bis(o-cresol) disulfide
Example 3: 2 parts bis(4,6-di-tert-butyl-m-cresol) disulfide Each batch was separately mixed 10 minutes in a suitable mixer and then cooked 4 hours at 175 lb./sq. in. steam pressure (378° F.) in a pan heater. The batches were then subjected to vacuum for 1 hour, massed, and then refined three passes on a tight, cool mill. The stock thickness of each is given in inches in the following table. Sheet thickness is a measure of softness or plasticity: the thinner the sheet, the greater the activity of the softening agents. Examples 1 and 2 do not come within the scope of the appended claims, but are added for comparison.

*Table I*

| Example | Thickness | Comments |
|---|---|---|
| 1 | .009 | Dry, with only fair body and a little tack. In general, not satisfactory. |
| 2 | .008 | Dry. Poor tack. In general, not satisfactory. |
| 3 | .007 | Very good body and good tack. Very good workability. |

EXAMPLES 4–7

Four batches of 100 parts each of 5-mesh vulcanized GR–S tire scrap (containing fabric) were weighed out. To each of these (except the one which was used as a control) was added one of the following reclaimed mixtures which were prepared by mixing about 9–10 parts of dipolymer oil, 6 parts wood rosin, 200 parts 1 per cent zinc chloride solution, and the following reagents:

Example 4: Nothing
Example 5: 1.5 parts diphenol sulfide
Example 6: 1.5 parts di(o-cresol) disulfide
Example 7: 1.5 parts bis(4,6-di-tert-butyl-m-cresol) disulfide Each batch was heated in a digester for 8 hours at 175 lb./sq. in. steam pressure (378° F.) and then dumped, washed, dried, massed, and refined by three passes through a tight mill. The following table records the results, the sheet thickness being recorded in inches:

*Table II*

| Example | Thickness | Comments |
|---|---|---|
| 4 | .011 | Very dry and lacy with no tack. Very poor body. Not satisfactory. |
| 5 | | Extremely poor sheet. Not satisfactory. |
| 6 | .009 | Lacy with practically no body or tack. Not satisfactory. |
| 7 | .007 | Very good body with good tack. Good workability. |

The reclaiming agents of Examples 4, 5, and 6 do not come within the scope of the invention and are included for comparison.

EXAMPLE 8

GR–S passenger tires were ground to pass through a 5-mesh screen. The mix was prepared as follows:

| | Parts |
|---|---|
| GR–S tire scrap (5-mesh) | 100 |
| Crude solvent naphtha | 8.5 |
| Wood rosin | 6.5 |
| Bis(4,6-di-tert-butyl-m-cresol) disulfide | 1.5 |
| 1% zinc chloride | 200 |

The batch was heated in a factory digester 8 hours at 175 lbs./sq. in. steam pressure (378° F.), dumped, washed, and dried. Two hundred and fifty pounds of the mix were massed for 10 minutes on an 84-inch mill. This was then refined, strained through a 22-mesh screen, and refined in the factory. The stock ran very clean with practically no tailings, had very good body and tack, and was very soft.

EXAMPLE 9

This factory batch was made up as follows:

| | Parts by weight |
|---|---|
| GR–S No. 1 peels (5-mesh) | 100 |
| Crude solvent naphtha | 8 |
| Wood rosin | 8 |
| Bis(4,6-di-tert-butyl-m-cresol) disulfide | 1.5 |

The ingredients were mixed, loaded into pans, cooked 4 hours at 175 lbs./sq. in. steam pressure (378° F.) in factory pan heaters and then subjected to vacuum for 1 hour. The stock was massed, refined, strained through a 22-mesh screen, and refined in the factory. The stock massed well, ran very well, smooth, soft, and had good body and tack. It strained satisfactorily.

EXAMPLE 10

The vulcanizate of this example was butyl rubber which had been cured with quinone dioxime or quinone dioxime dibenzoate (known as GMF and GMF dibenzoate cures). The rubber was ground to pass a 5-mesh screen. One hundred parts of this were heated for 8 hours at 378° F. with 5 parts of a 20 per cent solution of bis(4,6-di-tert-butyl-m-cresol) disulfide in high-boiling hydrocarbon solvent in a factory pan devulcanizer. The following treating bath was used:

| | Parts by weight |
|---|---|
| GMF cured butyl scrap (5-mesh) | 100 |
| Crude solvent naphtha | 2 |
| Wood rosin | 2 |
| Bis(4,6-di-tert-butyl-m-cresol) disulfide | 1 |

The finished reclaim possessed fair body and good tack and good workability.

EXAMPLE 11

The stock treated was black air bags of natural rubber. These were cut to approximately ¼-inch mesh.

The treating formula was:

| | Parts |
|---|---|
| Natural rubber (black air-bag scrap) | 100 |
| High-boiling petroleum distillate softener (Paraflux) | 6 |
| 20% solution of bis(4,6-di-tert-butyl-m-cresol) disulfide in high-boiling hydrocarbon solvent | 1.5 |

The batch was heated in a pan heater for 5 hours at 330° F. The devulcanized biscuits were refined by two passes in the factory and possessed fair body and tack with generally satisfactory workability.

EXAMPLE 12

The vulcanizate treated was neoprene thread scrap. The petroleum softener and solution of chemical softener were the same as in the preceding example.

| | Parts |
|---|---|
| Scrap neoprene | 100 |
| Paraflux | 40 |
| 20% solution of chemical softener | 7.5 |
| Wood rosin | 5 |

The mixture was heated in a pan heater for 7½ hours at 330° F. The devulcanized biscuits were of good quality. Upon refining, the sheet possessed good body and tack properties.

EXAMPLE 13

The stock of this example was peelings from bus and truck tires. As usual for such stock, the peelings were high in carbon black. The solution of chemical softener was the same as in the two preceding examples.

| | Parts |
|---|---|
| GR–S No. 1 giant peelings | 100 |
| Coal-tar naphtha | 3 |
| Wood rosin | 2 |
| 20% solution of chemical softener | 0.75 |

This was heated 1 minute at 250 pounds steam pressure, and then 5 minutes at 900 pounds steam pressure. Such high temperature treatment is best suited to the reclaiming of fabric-free vulcanizate where quality is desired because the reclaim is freer of added materials. The reclaim was found to have good properties of softness, body, and tack.

EXAMPLE 14

In carrying out this example, unsorted recapped passenger tires were reclaimed. The treating formula was:

| | Parts |
|---|---|
| Unsorted recapped passenger tires | 100 |
| Pine-tar oil | 2.7 |
| Wood rosin | 3.3 |
| Bis(4,6-di-tert-butyl-m-cresol) disulfide | 0.5 |
| Water | 200 |
| Zinc chloride | 2 |

The batch was cooked 9 hours at 175 pounds steam pressure in a factory digester. The resulting reclaim was found to have good properties of body and tack with a thin sheet.

EXAMPLES 15 AND 16

GR–S tread scrap was ground to about 5 mesh and treated according to the following formulae:

| | Example 15 | Example 16 |
|---|---|---|
| | Parts | Parts |
| GR–S tread scrap | 100 | 100 |
| Terpene hydrocarbon (B. P. 173–201° C.) | 6 | 6 |
| Cumar 2½ MH | 6 | 6 |
| Bis(4,6-di-tert-butyl-m-cresol) disulfide | 1.5 | |
| Bis(2,3,5-trimethylphenol) disulfide | | 1.5 |

Each batch was mixed 10 minutes and then cooked 4 hours at 175 pounds steam pressure. It was then treated under a vacuum 1 hour and refined by three passes through a cool mill. The reclaims formed thin sheets and had good body and tack. Both reclaims had a Mooney plasticity (ML/4/212) of 36.

Thus, it is seen that the bis(trialkylphenol) sulfides are generally useful in the reclaiming of vulcanizates at temperatures of 300° F. and above. Temperature and time of treatment will depend upon the nature of the stock, etc. In carrying out the reclaiming operations, the bis(trialkylphenol) sulfide may be introduced separately or in solution in a softening or swelling agent. The treating bath may be an aqueous emulsion in which the noncontinuous phase is a solution of the bis(trialkylphenol) sulfide. The concentration of bis(trialkylphenol) sulfide in the solution or other treating bath may be varied to suit the particular need of the scrap to be reclaimed. It may vary from 0.1 per cent to as high as 100 per cent. Other softeners and treating agents, solvents, diluents, etc., may be employed as desired without departing from the invention which is defined in the claims which follow.

What I claim is:

1. The process of reclaiming a rubbery vulcanizate of the class consisting of vulcanizates of natural rubber, polymerized chloroprene, copolymer of isobutylene and a relatively small amount of a monomer of the class consisting of butadiene-1,3 and isoprene, copolymer of butadiene-1,3 and styrene, copolymer of butadiene-1,3 and acrylonitrile, and mixtures thereof which comprises heating the same at a temperature of at least 300° F. with bis(4,6-di-tert-butyl-m-cresol) disulfide, sulfur of the sulfide being linked to the 2-position in the ring.

2. The process of reclaiming vulcanized, rubbery copolymer of butadiene-1,3 and styrene which comprises heating the same at a temperature of at least 300° F. with a bis(trialkylphenol) sulfide which has the formula:

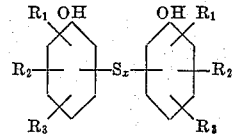

where $R_1$, $R_2$ and $R_3$ are alkyl groups each containing one to nine carbon atoms, the total number of carbon atoms in said alkyl groups is no more than twenty, $x$ is 1 to 4, and in each aryl nucleus at least one of the positions ortho and para to the hydroxyl is unalkylated and linked to the sulfur.

3. The process of reclaiming vulcanized, rubbery copolymer of butadiene-1,3 and styrene which comprises heating the same at a temperature of at least 300° F. with a reclaiming agent which is a bis(trialkylphenol) sulfide which has the formula:

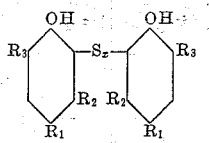

where $R_1$, $R_2$ and $R_3$ are alkyl groups containing one to nine carbon atoms, $x$ is 1 to 4, and the total number of carbon atoms in $R_1$, $R_2$ and $R_3$ is no more than twenty.

4. The process of reclaiming vulcanized, rubbery copolymer of butadiene-1,3 and styrene which comprises heating the same at a temperature of at least 300° F. with a bis(3,4,6-trialkylphenol) sulfide in which one of the alkyl groups is methyl and the other two each contain one to nine carbon atoms, sulfur of the sulfide being linked to the 2-position in the ring.

5. The process of reclaiming vulcanized, rubbery copolymer of butadiene-1,3 and styrene which comprises heating the same at a temperature of at least 300° F. with a bis(4,6-dialkyl-m-cresol) sulfide in which the groups designated alkyl each contain one to nine carbon atoms, sulfur of the sulfide being linked to the 2-position in the ring.

6. The process of reclaiming vulcanized, rubbery copolymer of butadiene-1,3 and styrene which comprises heating the same at a temperature of at least 300° F. with bis(4,6-di-tert-butyl-m-cresol) disulfide.

HARRY E. ALBERT.

REFERENCES CITED

The following references are of record in the file of this patent:

UNITED STATES PATENTS

| Number | Name | Date |
|---|---|---|
| 1,996,001 | Seaman | Mar. 26, 1935 |
| 2,191,266 | Williams | Feb. 20, 1940 |
| 2,359,122 | Kirby et al. | Sept. 26, 1944 |
| 2,363,873 | Kirby et al. | Nov. 28, 1944 |
| 2,372,584 | Kirby et al. | Mar. 27, 1945 |
| 2,402,448 | Richards | June 18, 1946 |
| 2,409,687 | Rogers et al. | Oct. 22, 1946 |
| 2,449,026 | Van Gilder | Sept. 7, 1948 |
| 2,495,145 | Smith et al. | Jan. 17, 1950 |